M. GIBSON.
ICE CREEPER.
APPLICATION FILED JAN. 23, 1912.
1,034,997.
Patented Aug. 6, 1912.
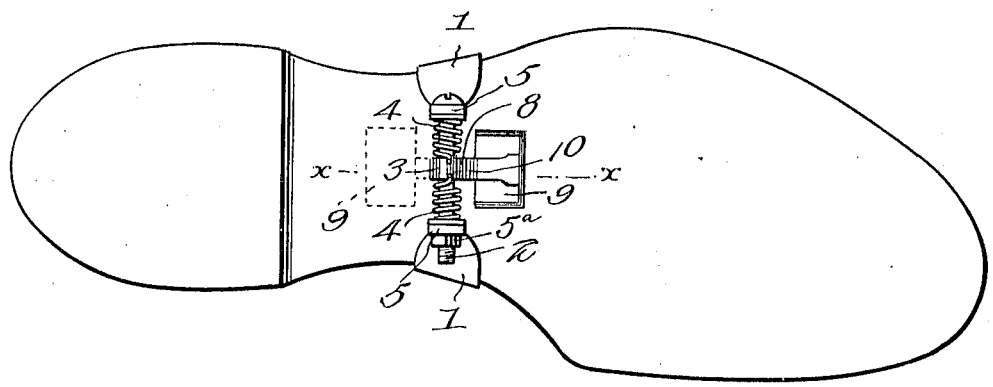
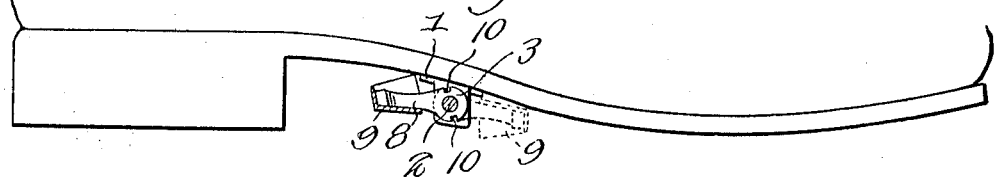
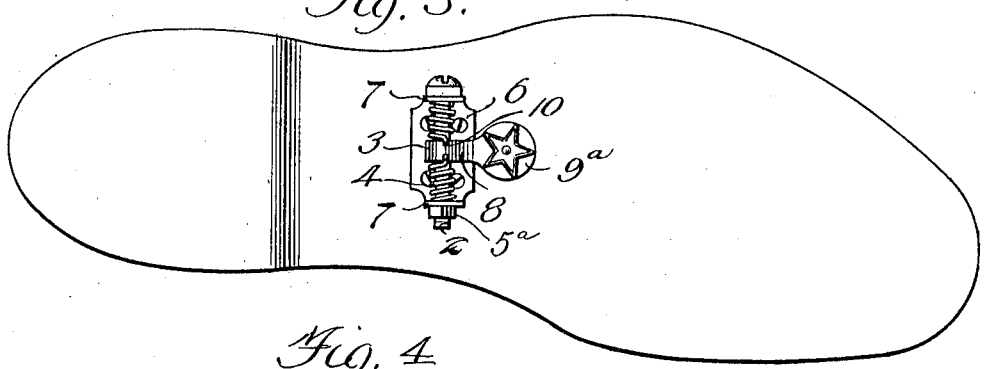
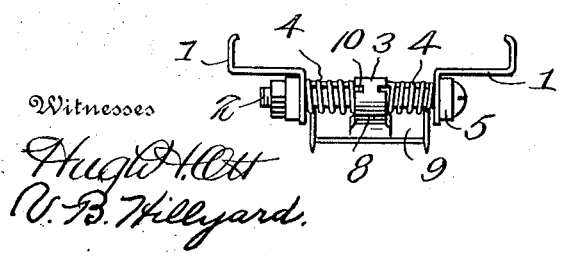
Inventor
Milton Gibson
By Victor J. Evans
Attorney
Witnesses
Hugh H. Ott
V. B. Hillyard

UNITED STATES PATENT OFFICE.

MILTON GIBSON, OF POINT MILLS, MICHIGAN.

ICE-CREEPER.

1,034,997. Specification of Letters Patent. Patented Aug. 6, 1912.

Application filed January 23, 1912. Serial No. 672,861.

*To all whom it may concern:*

Be it known that I, MILTON GIBSON, a citizen of the United States, residing at Point Mills, in the county of Houghton and State of Michigan, have invented new and useful Improvements in Ice-Creepers, of which the following is a specification.

This invention provides an anti-slipping device for attachment to boots, shoes, rubbers or the like to enable a person to walk with comparative safety upon ice, sleet, snow, or like slippery surfaces.

The invention provides a simple device which may be fitted to a shoe or rubber and which may be thrown into operative position when required or out of active position upon entering a dwelling or analogous structure so as to prevent injury to floors, tiling or like indoor surfaces.

The invention consists of the novel features, details of construction and combination of parts, which hereinafter will be more particularly set forth, illustrated in the accompanying drawing, and pointed out in the appended claims.

Referring to the drawing, forming a part of the specification:—Figure 1 is an under side view of an ice creeper embodying the invention, showing the same fitted to a shoe, the full lines illustrating the operative position of the device and the dotted lines showing the device thrown out of active position to prevent injury to floors, tiled surfaces and the like. Fig. 2 is a section on the line $x$—$x$ of Fig. 1, showing the lower portion of the shoe in elevation, the full lines illustrating the dog thrown up out of the way and the dotted lines indicating the dog thrown into working position. Fig. 3 is a view similar to Fig. 1, of a modification shown applied to an overshoe or rubber. Fig. 4 is a front view of the device.

Corresponding and like parts are referred to in the following description, and indicated in all the views of the drawing by the same reference characters.

The device comprises a dog and a holder, the latter being variously formed according to the specific application of the device. The dog is substantially the same for all purposes in so far as it comprises a shank and a head and is pivoted by a shank to the holder.

As illustrated in Figs. 1, 2 and 4, the holder comprises similar clamps 1 which are adapted to grip opposite edges of the shank portion of the shoe sole. A screw or threaded pin 2 is supported in ears of the clamps 1 and receives the dog 3 and helical springs 4, the latter being arranged upon opposite sides of the shank of the dog and between said shank and the clamps so as to hold the dog either in active position or out of operation, as indicated most clearly by the full and dotted lines in Figs. 1 and 2. Washers 5 are mounted upon end portions of the screw or pin 2 and bear against the ears of the clamps 1 and reinforce said ears and sustain the strain exerted by the screw or pin 2 when drawing the clamps inward to hold the device upon the shank of the shoe. A nut $5^a$ is mounted upon the screw 2 and acts jointly therewith to secure the device to the shoe. The clamps 1 may be provided in different sizes to adapt the device for different sizes of shoes such as children, youths and adults. The screw or threaded pin 2 may be turned either by means of a screw-driver or other device.

The form of holder shown in Fig. 3 is chiefly adapted for overshoes, rubbers or men's shoes of large size and comprises a plate 6 and ears 7. The plate 6 has openings to receive screws or like fastenings by means of which the device is attached to the shank of the shoe. The openings in the ears 7 receive the screw or threaded pin 2.

The dog 3 comprises a shank 8 and head 9, the latter being hollow and consisting of a plate having flanges at three of its edges, said flanges being sharpened to bite into the ice so as to prevent slipping. The sides of the shank are formed with notches 10 which engage the inner ends of the helical springs 4 so as to hold the dog in either one of its extreme positions, that is, in or out of active position. When thrown into operative position, the head of the dog extends beneath the sole of the shoe and occupies a position about in line with the juncture of the shank and the sole, thereby causing the flanges of the head to face downwardly so as to positively engage the icy surface. When the dog is turned to occupy an inoperative position the flanges face upwardly to bring their sharpened edges against the shank of the shoe so as not to engage the surface of a floor, tiling or the like and mar or injure the same. The springs 4 are of the expansible type and have their outer ends secured in any manner to prevent their turning. The inner ends of the springs are of such a formation as to enter the notches 10 and hold the dog 3 in the required position, or to ride out of said notches by an outward longitudinal movement when force is applied to the dog to move it from one position to the other.

The device is adapted to be fitted to the shank of the shoe in the rear of the ball of the foot in such position that when the dog is turned into operative position, it projects below a straight line touching the tread of the heel and the sole, as indicated most clearly by the dotted lines in Fig. 2. When the dog is thrown into an inoperative position it comes beneath the shank of the shoe, as indicated to the best advantage by the full lines in Fig. 2, thereby being entirely out of the way so as to avoid injury to indoor surfaces, such as floors, tiling and the like. The head portion of the dog may be provided with any matter to be printed upon the icy surface so as to be used for advertising purposes, or it may be of any form, such as a star, as indicated at 9$^a$ in Fig. 3.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired, as are within the scope of the claims appended hereto.

Having thus described the invention, what is claimed as new, is:—

1. In an ice creeper, the combination of a holder embodying ears, a pin supported in the ears of the holder, a dog mounted upon the pin and having notches in opposite sides, and helical springs mounted upon end portions of the pin and confined between opposite sides of the shank of the dog and the ears of the holder and adapted to secure the dog in either one of its extreme positions.

2. An ice creeper comprising a holder embodying apertured ears, a pin supported in the ears of the holder, a dog mounted upon the pin and comprising a shank and a head, the shank having notches in opposite sides and the head having flanges which are sharpened to provide biting edges, and helical springs mounted upon the pin and confined between the shank of the dog and the ears of the holder so as to secure the dog in either one of its extreme positions.

In testimony whereof I affix my signature in presence of two witnesses.

MILTON GIBSON.

Witnesses:
THOMAS H. GIBSON,
OLIVER MAXIM.

Copies of this patent may be obtained for five cents each, by addressing the "Commissioner of Patents, Washington, D. C."